United States Patent
Arshavsky et al.

(10) Patent No.: US 8,219,591 B2
(45) Date of Patent: Jul. 10, 2012

(54) GRAPH QUERY ADAPTATION

(75) Inventors: Vadim Arshavsky, Matan (IL); Uri Ben-Dor, Givat Shmuel (IL); Ofer Karp, Yehud (IL); Emil Shmul, Yehud (IL); Tal Broner, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 327 days.

(21) Appl. No.: 12/772,479

(22) Filed: May 3, 2010

(65) Prior Publication Data

US 2011/0270861 A1 Nov. 3, 2011

(51) Int. Cl.
*G06F 17/30* (2006.01)

(52) U.S. Cl. .... 707/798; 707/769; 707/956; 707/E17.04

(58) Field of Classification Search .................. 707/769, 707/798, 956, 999.003
See application file for complete search history.

(56) References Cited

U.S. PATENT DOCUMENTS

| 5,878,431 A * | 3/1999 | Potterveld et al. ............. 707/694 |
| 2006/0031219 A1 * | 2/2006 | Chernyak et al. .................. 707/5 |
| 2007/0064627 A1 * | 3/2007 | Campos ........................ 370/255 |
| 2007/0282789 A1 * | 12/2007 | Deshpande et al. ............... 707/2 |
| 2008/0059439 A1 * | 3/2008 | Fan et al. ........................... 707/4 |
| 2008/0294615 A1 * | 11/2008 | Furuya et al. ....................... 707/4 |
| 2010/0185994 A1 * | 7/2010 | Pikus et al. ......................... 716/5 |
| 2011/0202511 A1 * | 8/2011 | Sityon et al. .................. 707/706 |

OTHER PUBLICATIONS

Takashi Washio and Hiroshi Motoda, "State of the Art of Graph-Based Data Mining", ACM SIGKDD Explorations Newsletter, vol. 5 Issue 1, Jul. 2003, pp. 59-68.*

* cited by examiner

*Primary Examiner* — Cheryl Lewis

(57) ABSTRACT

Systems, methods, and other embodiments associated with graph query adaptation are described. One example method includes generating an adapted topological query from a base topological query. The adapted topological query may be generated upon detecting a pre-specified sub-graph in the base topological query. The example method may also include executing the adapted topological query on a stored graph to generate a query result.

15 Claims, 6 Drawing Sheets

GRAPH QUERY ADAPTATION

BACKGROUND

Directed graphs may be used to model information technology (IT) infrastructures. As an IT infrastructure expands, it may be more difficult for a graph modeling the infrastructure to be searched. Furthermore, applications that integrate with the graph may not be interested some information contained in the graph. For example, a management application may list computers at various locations, but may not use data describing routers and switches to which the computers are connected, even though the IT infrastructure graph may contain networking information. In another example, applications that integrate with the graph may be interested in information which is not directly stored in the graph. Conventionally, when an application desires additional information, the graph may be modified to contain this information. However, this may not be efficient.

Typical applications are designed to be integrated with specific graph models and to handle unnecessary information at the application level. This may include removing or ignoring unnecessary information when it is acquired from the graph model, as well as adding information otherwise unimportant to the application when sending information to the graph model. However, as the number of applications increases over time, it may not be economical for applications to be designed to work with specific models. Furthermore, when the graph model is updated to a new version, applications that are not configured to work with the new version may cease to function.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
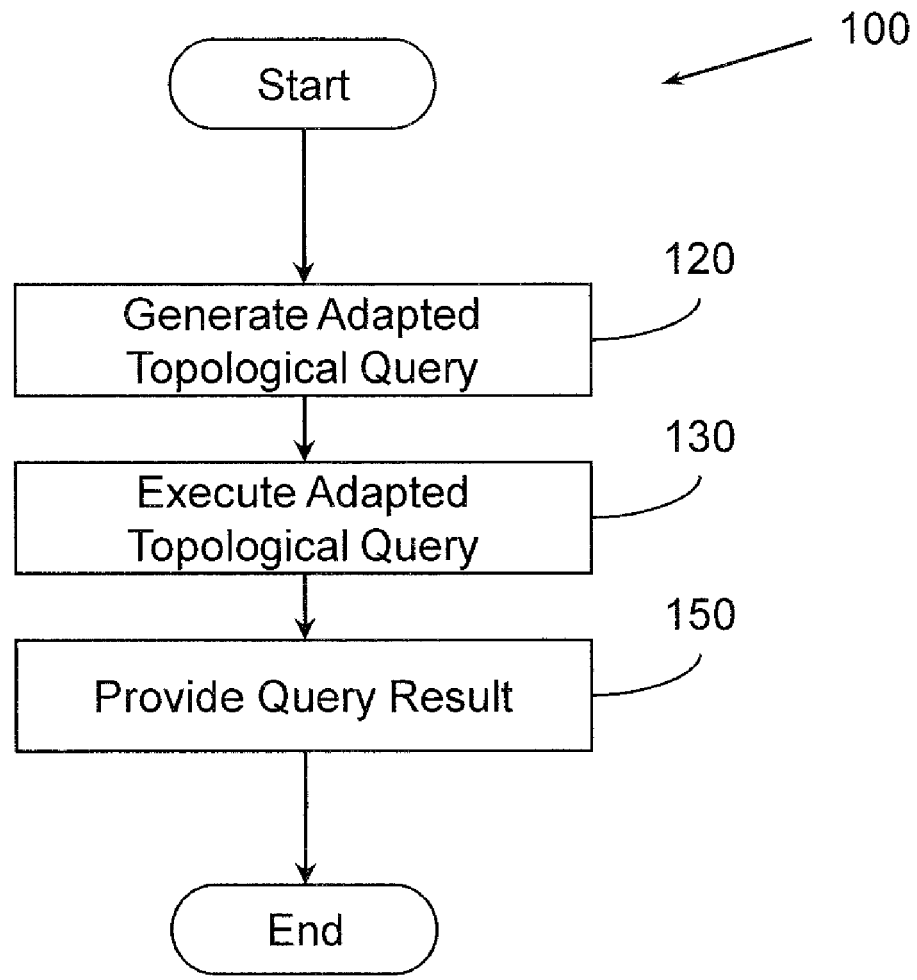
FIG. 1 illustrates an embodiment of a method associated with graph query adaptation.

Systems and methods stored on computer-readable media associated with graph query adaptation are claimed and described. One example method stored on a computer-readable medium includes generating an adapted topological query from a base topological query upon detecting a prespecified sub-graph in the base topological query. The example method also includes executing the adapted topological query on a stored graph.

By adapting an incoming query to work with a model associated with the stored graph, applications that are providing queries to be run on the stored graph may not be required to manipulate their queries for the specific model of the stored graph. Furthermore, if the model is updated, a series of transformations may be made to queries provided using the old model. This may allow an application configured to work with the previous model to continue to function with the updated data model. Additionally, some engines that handle graph searching queries can also efficiently manipulate graph data. Handling graph data transformations at the engine may reduce application development costs. Costs associated with upgrading the engine to a new model may also be reduced because queries designed for the previous model may be transformed by the engine meaning applications do not need to be updated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), an optical media, a random access memory (RAM), a read only memory (ROM), a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, instructions in memory, instructions in execution on a machine, and/or combinations of each to perform a function(s) or an action(s), and/or to cause a function or action from another logic, method, and/or system. Logic may include a instruction controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language, an object query language (OQL), a natural language, and so on.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities.

It has proven convenient at times, principally for reasons of common usage, to refer to these physical quantities as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 6:
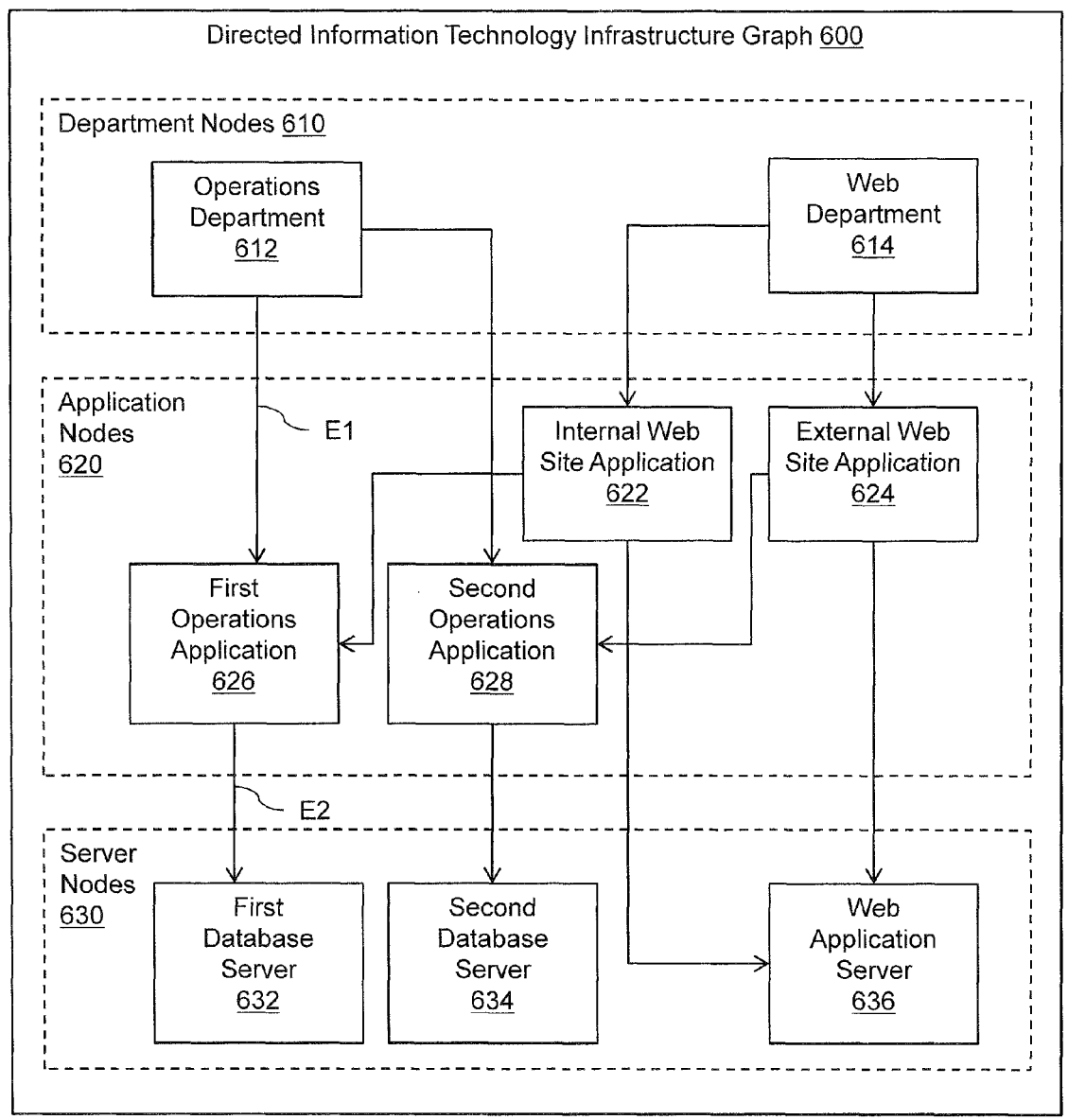
FIG. 6 illustrates an embodiment of a directed information technology infrastructure graph with which example systems and methods, and equivalents may interact.

FIG. 1 illustrates an embodiment of a method 100 associated with graph query adaptation. Some actions described in reference to method 100 may be performed on a graph similar to directed graph 600 (FIG. 6). At 120, method 100 includes generating an adapted topological query from a base topological query. The base topological query may contain a query graph that is modified to generate the adapted topological query. A query graph in the adapted topological query may have either a greater or lesser number of nodes and edges when compared to a query graph in the base topological query.

At 130, method 100 includes executing the adapted topological query on a stored graph to generate a query result. In one example, nodes in the stored graph may represent elements of an information technology (IT) infrastructure. Thus, edges in the stored graph may represent relationships between elements of the IT infrastructure. Nodes in the stored graph may also describe, for example, bioinformatics data, map data, and so on. The query result may be, for example, a graph(s) that represents a result of a search of the stored graph, a conformation of a successful transformation of the stored graph, and so on. At 150, method 100 includes providing the query result. In one example, the query result may be provided to a client that provided the base topological query. Method 100 may allow the client to send a base topological query that is expressed in terms of a first data model and have the base topological query match a data structure of a stored graph having a second data model. This may make the client less complex and reduce development costs of applications running on the client over time.

FIG. 6 shows an example directed graph 600 of relationships between entities in a portion of an IT infrastructure. Graph 600 is an example stored graph on which the adapted topological query could be executed at 130. The graph 600 includes several application nodes 620 (e.g., internal web site application node 622, external web site application node 624, first operations application node 626, second operations application node 628) that may represent applications and/or computers on which the applications are operating. The graph 600 also includes several server nodes 630 (e.g., first database server node 632, second database server node 634, web application server node 636) that may represent servers. The graph 600 also includes several department nodes 610 (e.g., operations department node 612, web department node 614) that may correspond to departments that are responsible for maintaining entities associated with application nodes 620 and/or server nodes 630. Thus, a node in an IT infrastructure graph may not necessarily be tied to a specific tangible item and may, for example, facilitate illustrating relationships between an IT infrastructure and a corporate structure. Furthermore, while several nodes and edges are shown in the graph 600, a person having ordinary skill in the art will recognize that this may not be an exhaustive list of nodes and edges, and that the categories of what nodes represent are merely chosen for example purposes and that other organizational schema may be applicable.

In this example, the directed edges in the graph are represented by arrows and illustrate relationships between components of the IT infrastructure. For example, a first edge E1 connecting the operations department node 612 to the first operations application node 626 may represent the fact that the operations department is responsible for managing a first operations application. A second edge E2 connecting the first operations application node 626 to the first database server node 632 may represent the fact that the first operations application relies on data from a first database server. While a directed graph is shown, a person having ordinary skill in the art will recognize that an undirected graph or a graph using some other organization scheme may also be used to represent an IT infrastructure.

While graph 600 could be an example query graph in either the base topological query or the adapted topological query, as used herein, graph 600 represents a graph with which topological queries are designed to interact. Thus, an example base topological query may contain a query graph comprising a first node representing a web department, a second node representing an internal web site application, and a third node representing a database server. The first node may be connected via an edge to the second node and the second node may be connected via an edge to the third node. However, in directed graph 600, edges do not directly span between an internal web site application and a database server. Thus, generating the adapted topological query may comprise adding a fourth node representing an operations application and an edge to the graph between the internal web site application node and the database server node in the query graph.

At 120, the adapted topological query may be generated upon detecting a pre-specified template sub-graph in the base topological query and replacing the pre-specified template sub-graph with a pre-specified substitution sub-graph. In one example, detecting the pre-specified sub-graph may comprise detecting an element in the pre-specified sub-graph that shares an attribute with a placeholder element of a template graph. For example, a template graph may specify an attribute for a first node, an attribute for a second node, and an attribute for an edge that connects the first node and the second node. A pre-specified sub-graph may be considered detected if a sub-graph of a query graph in the base topological query is detected that contains these attributes. While a template graph having multiple nodes is described, the pre-specified sub-graph may be a single node.

By way of illustration, a template graph may comprise an internal web site application node connected to a database server node. In detecting a sub-graph in a base topological query according to the template graph, an adapted sub-graph may be selected to replace the sub-graph to generate the adapted topological query. In this example, the adapted sub-graph may be an internal web site application node connected to an operations application node that is connected to a database server node.

Generating the adapted topological query at 120 may comprise replacing the pre-specified sub-graph with an adapted sub-graph. This may mean, for example, that the adapted topological query is generated by directly modifying the base topological query, that the adapted topological query is generated in the process of making a copy of the base topological query, and so on. In one example, the adapted sub-graph may be specifically defined in advance based on the pre-specified sub-graph. In another example, the adapted sub-graph may comprise information extracted from the base topological query based on a pattern graph. Thus, the adapted sub-graph may be programmatically generated from information identified in a pattern graph that specifies what information to find in the base sub-graph.

Generating the adapted topological query at 120 may also include managing edges that bridge nodes in a sub-graph of the base query that match the pre-specified sub-graph and nodes not in the sub-graph. Vertices of a query graph connected to edges may be provided with logical edge conditions. While transforming a base query into the adapted query, edge conditions may be transform according to edge conditions of vertices of the base query and edge conditions of vertices of the pre-specified substitution sub-graph. In one example, this may mean splitting a base query into several independent sub-graphs and transforming them separately. This may result in multiple adapted queries which may be executed independently and their outcomes unified later. Consider a base edge in a base topological query that connects a first node that borders a pre-specified sub-graph in the base topological query to a second node in the pre-specified sub-graph. Generating the adapted topological query at 120 may comprise attaching a first end of a directed edge to a node in the adapted topological query that corresponds to the first node. Generating the adapted topological query at 120 may also comprise attaching a second end of the directed edge to a node in the adapted sub-graph. Attaching edges that bridge nodes inside and outside the pre-specified sub-graph in the base topological query may ensure that data is not lost during the construction of the adapted topological query. The direction of the directed edge may be based on the direction of the base edge. Which node in the adapted sub-graph the second end is attached to may be specified, for example, by a pattern graph.

While FIG. 1 illustrates various actions occurring in serial, it is to be appreciated that various actions illustrated in FIG. 1 could occur substantially in parallel. By way of illustration, a first process could generate an adapted topological query from a base topological query, a second process could execute the adapted topological query, and a third process could provide a query result. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with the above method are described as being stored on a computer-readable medium, it is to be appreciated that executable instructions associated with other example methods described herein may also be stored on a computer-readable medium.

Figure 2:
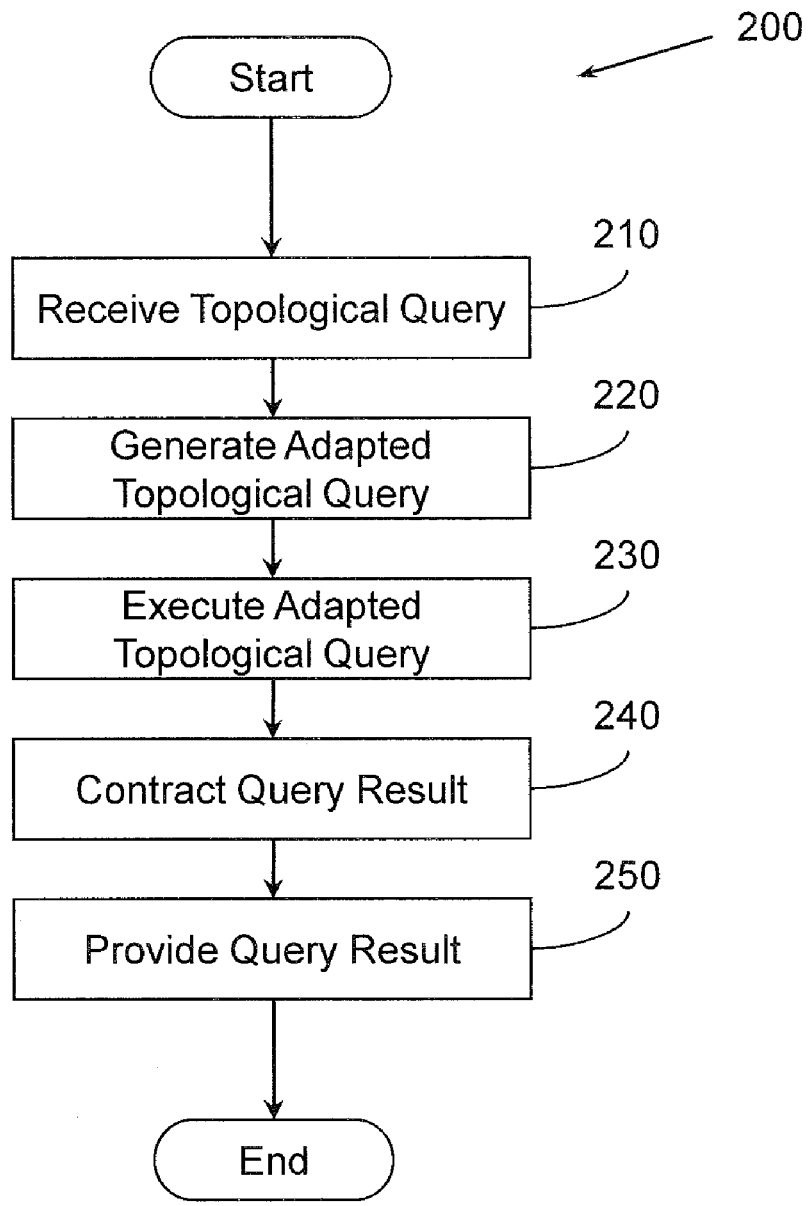
FIG. 2 illustrates an embodiment of a method associated with graph query adaptation.

FIG. 2 illustrates an embodiment of a method 200 associated with graph query adaptation. FIG. 2 contains several actions similar to those described in reference to method 100 (FIG. 1). For example, method 200 includes generating an adapted topological query from a base topological query at 220, executing the adapted topological query at 230, and providing a query result at 250. However, method 200 includes additional actions.

At 210, method 200 includes receiving the base topological query. In one example, the base topological query may be received from a client. In this example, the query result may be provided to the client. At 240, method 200 includes contracting the query result. Contracting the query result may comprise replacing an instance of the substitution sub-graph in the query result with an instance or instances of the pre-specified template sub-graph. In order to detect data corresponding with an outcome instance, a pre-specified substitution sub-graph may be provided with identification rules that define what part of the query result should be contracted when overlapping portions of the query result match the pre-specified substitution sub-graph. By way of illustration, a vertex C of a base query may be transformed into vertices C1 and C2 and an edge connecting C1 and C2. If node C1 is also connected by an edge to a node C3 that has the same type as C2, then an identification rule may ensure that the sub-graph containing C1 and C2 are contracted and not the sub-graph containing C1 and C3. Contracting the query result may facilitate returning data to the client that the client understands. This may reduce the amount of data transformations performed by the client. When an engine for executing queries on the stored graph is also an efficient mechanism for transforming data in graph format, contracting the query result at the engine instead of the client may further reduce query execution time.

By way of illustration a query to be run on graph 600 (FIG. 6) may be received. The query may seek graphs containing a web department node that is attached to a database server node. However, the model in graph 600 may not contain direct links between web department nodes and database server nodes. However, base topological queries that identify a database server node may be received from the client. This type of base topological query may be configured to be transformed to include a web site application node and an operations application node to match the model of graph 600. Thus, an adapted topological query may be generated comprising a web department node, a web site application node, an operations application node, and a database server node. The web department node may be connected to the web site application node, the web site application node may be connected to the operations node and the operations application node may be connected to the database server node. Running the adapted topological query on graph 600 may produce a query result containing at least a graph comprising nodes associated with web department node 614, internal web site application node 622, first operations application node 626, and first database node 634. However, this graph may contain information that is not used by the client. Thus, the transformation made to generate the adapted topological query may be reversed to contract the query result. This may result in a graph in the query result that contains a node associated with web department node 614 that is attached by an edge to a node associated with first database server node 632. Thus, the client may have to traverse or remove nodes from the graph in the query result. This may allow the client to more quickly process the information it had originally been seeking.

Figure 3:
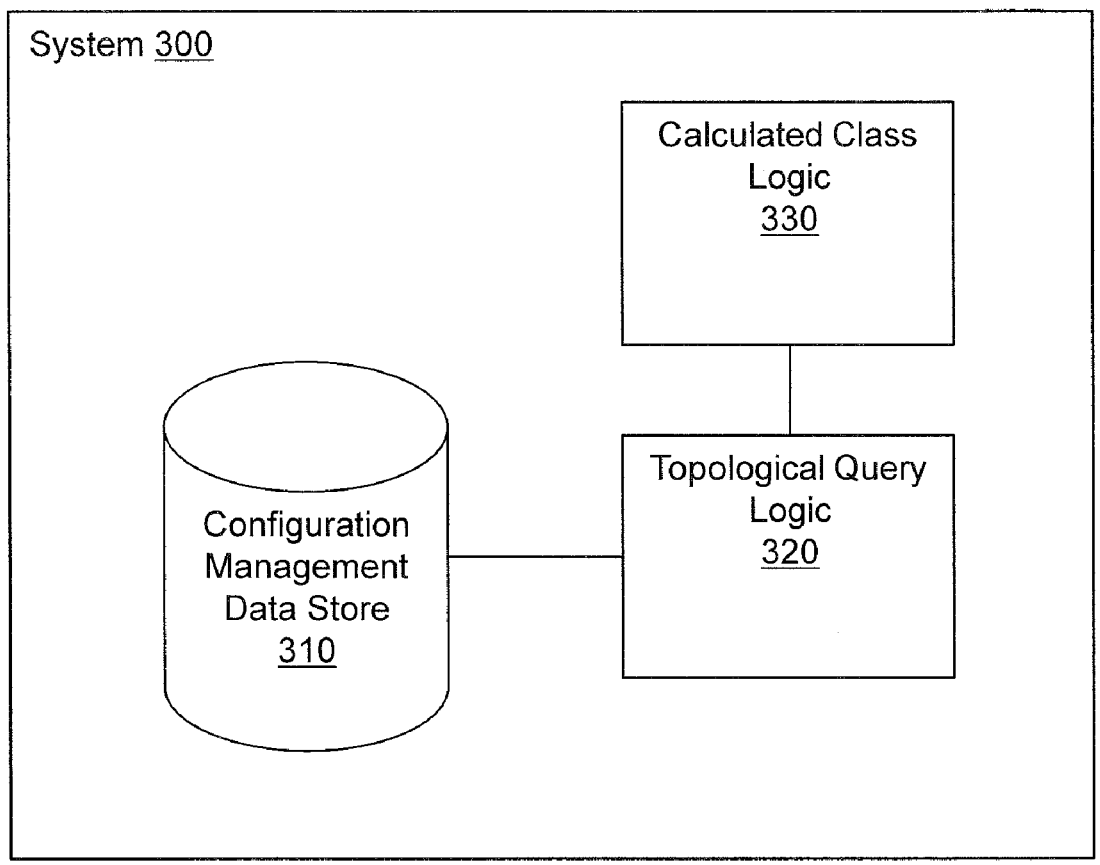
FIG. 3 illustrates an embodiment of a system associated with graph query adaptation.

FIG. 3 illustrates an embodiment of a system 300 associated with graph query adaptation. System 300 includes a configuration management data store (CMDB) 310. CMDB 310 may store descriptions of components of an information technology (IT) infrastructure. CMDB 310 may also store a graph describing relationships between the components of the IT infrastructure.

System 300 also includes a calculated class logic 330. Calculated class logic 330 may transform an application query into a graph query. The application query may comply with an application data model that is associated with an external application. The graph query may comply with a graph data model that is associated with the stored graph. The application query may be transformed into the graph query as a function of calculated class data. In one example, calculated class data may describe a sub-graph that is to replace a portion of the application query in the graph query. In one example, the portion of the application query to be replaced may be a portion of a graph in the application query. Replacing the portion of the application query to generate the graph query may ensure that the graph query complies with the graph data model. The calculated class data may also describe how to preserve logical conditions and links associated with the portion of the application query in the graph query.

System 300 also includes a topological query logic 320. Topological query logic 320 may execute the graph query on the directed graph. Topological query logic 320 may also provide a result graph as a function of the graph query. The result graph may be provided to a client from which the application query originated. The client may be running an application with which the application model is associated.

Thus, system 300 may facilitate transforming a topological query from an application into a topological query that can be understood by the CMDB 310. This may reduce application development costs because there may be several different models that the CMDB 310 could be running. Application development costs may be further reduced by not having to worry about updating the application when the CMDB 310 is updated to a model unsupported by the application. Instead, system 300 provides a way to make a CMDB configurable to function with a larger variety of applications. Even if the CMDB data model is updated to a new version that would make a previous query unmanageable under the new data model, calculated class data may be provided that helps transform queries from the old data model to the new data model. Thus, previously functioning applications may not need to be updated as a result of an updated CMDB.

Figure 4:
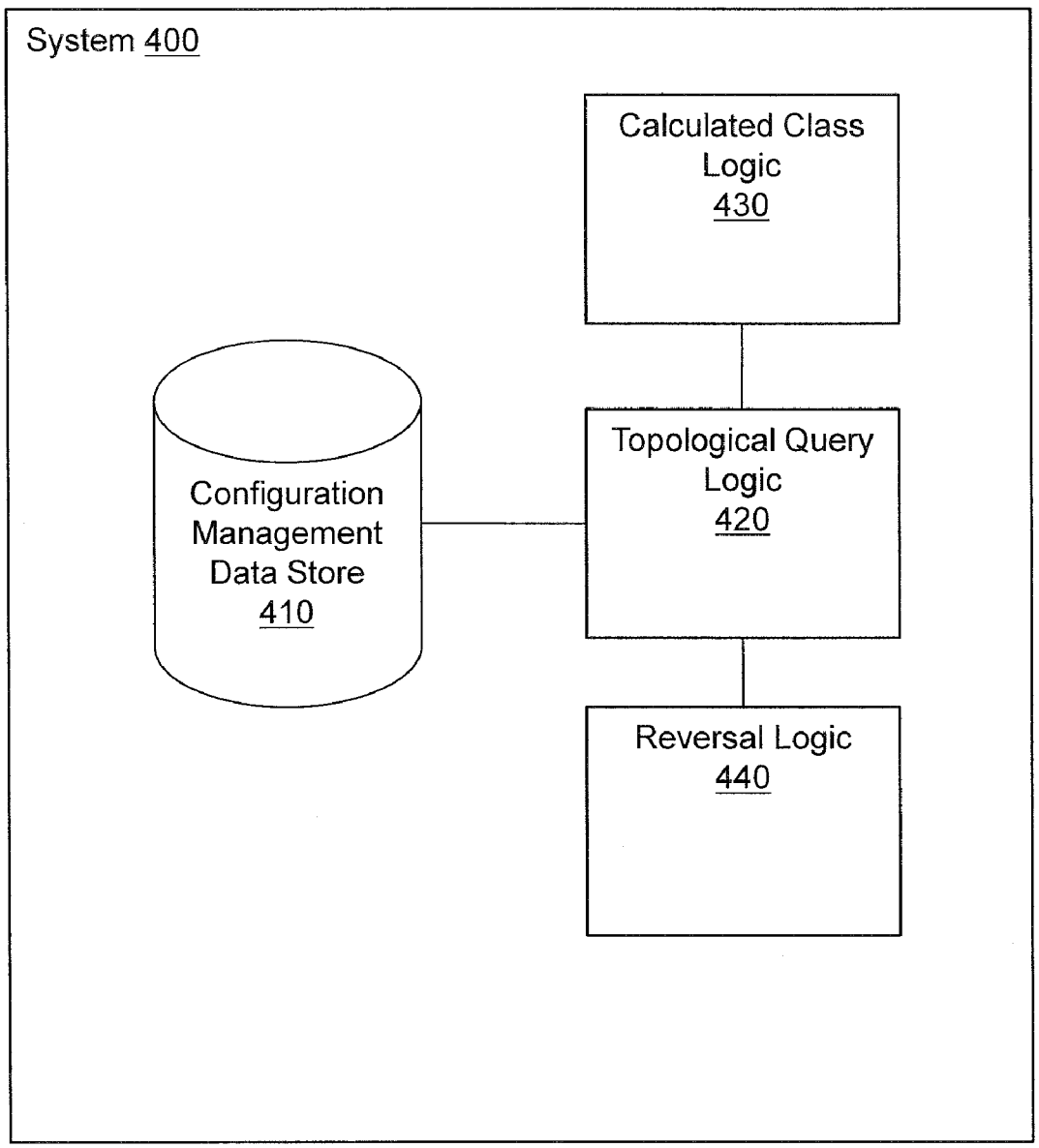
FIG. 4 illustrates an embodiment of a system associated with graph query adaptation.

FIG. 4 illustrates an embodiment of a system 400 associated with graph query adaptation. System 400 includes several elements similar to those described in reference to system 300 (FIG. 3). For example, system 400 includes a CMDB 410, a topological query logic 420, and a calculated class logic 430. However, system 400 includes an additional element.

System 400 includes a reversal logic 440. Reversal logic 440 may transform the result graph that complies with the graph model into a result graph that complies with the application model. In one example, reversal logic 440 may rewind stack data generated by the calculated class logic 430. The stack data may describe a series of transformations made by the calculated class logic 430.

Thus, system 400 illustrates how to transform data sent to a client so that the client can understand the data without having to perform data transformations itself. Calculated class logic 430 may generate a stack listing transformations performed on a query while the query is being transformed. After a result is acquired, reversal logic 440 may read transformations off the top of the stack effectively reversing the order in which they were performed to transform the result into a format that the application requested and understands.

Figure 5:
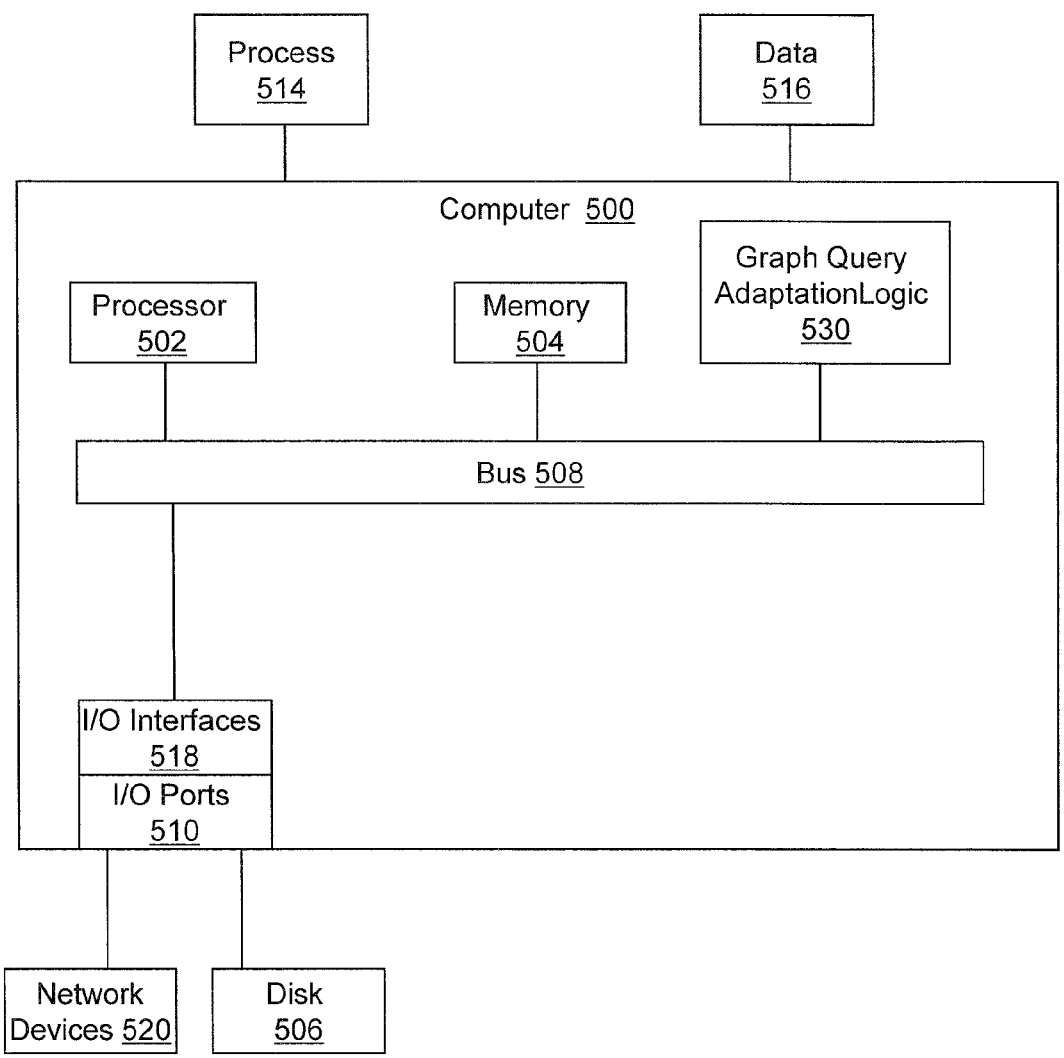
FIG. 5 illustrates an embodiment of a computing environment in which example systems and methods, and equivalents, may operate.

FIG. 5 illustrates an example embodiment of a computing device in which example systems and methods described herein, and equivalents, may operate. The example computing device may be a computer 500 that includes a processor 502, a memory 504, and input/output ports 510 operably connected by a bus 508. In one example, the computer 500 may include a graph query adaptation logic 530. In different examples, the graph query adaptation logic 530 may be implemented in hardware, instructions in memory, instructions in execution, firmware, and/or combinations thereof. While the graph query adaptation logic 530 is illustrated as a hardware component attached to the bus 508, it is to be appreciated that in one example, the graph query adaptation logic 530 could be implemented in the processor 502.

Graph query adaptation logic 530 may provide means (e.g., hardware, instructions in memory, instructions in execution, firmware) for transforming a query from a first model associated with an application to a second model associated with a stored graph. The means may be implemented, for example, as an ASIC. The means may also be implemented as computer executable instructions that are presented to computer 500 as data 516 that are temporarily stored in memory 504 and then executed by processor 502.

Graph query adaptation logic 530 may also provide means (e.g., hardware, instructions in memory, instructions in execution, firmware) for executing the query on a stored graph to generate a query result. Graph query adaptation logic 530 may also provide means (e.g., hardware, instructions in memory, instructions in execution, firmware) for transforming the query result from the second model to the first model. Thus, graph query adaptation logic may make it so the application does not have to be developed to generate or understand queries that comply with the second model.

Generally describing an example configuration of the computer 500, the processor 502 may be a variety of various processors including dual microprocessor and other multiprocessor architectures. A memory 504 may include volatile memory (e.g., a RAM) and/or non-volatile memory (e.g., a ROM).

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a flash memory card, an optical disc, a memory stick, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., peripheral component interconnect express (PCIE), 1394, universal serial bus (USB), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a local area network (LAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
generating, in response to detecting a pre-specified sub-graph in a base topological query, an adapted topological query from a base topological query,
the generating including replacing the pre-specified sub-graph with an adapted sub-graph by attaching a first end of a directed edge to a node in the adapted topological query that corresponds to a node in the base topological query and attaching a second end of the directed edge to a node in the adapted sub-graph, the node in the base topological query connected to a node in the pre-specified sub-graph by as base edge;
executing the adapted topological query on a stored graph to generate a query result; and providing the query result.

2. The non-transitory computer-readable medium of claim 1, where the pre-specified sub-graph is a single node.

3. The non-transitory computer-readable medium of claim 1, the method comprising receiving the base topological query from a client and where the query result is provided to the client.

4. The non-transitory computer-readable medium of claim 1, the method comprising detecting the pre-specified sub-graph by detecting an element in the pre-specified sub-graph, where the element shares an attribute with a placeholder element of a template graph.

5. The non-transitory computer-readable medium of claim 1, wherein the replacing the pre-specified sub-graph with an adapted sub-graph is in response to detecting the base edge that connects the node in the base topological query to the node in the pre-specified sub-graph.

6. The non-transitory computer-readable medium of claim 1, where the adapted sub-graph comprises information extracted from the base topological query based on a pattern graph.

7. The non-transitory computer-readable medium of claim 1, the method comprising contracting the query result.

8. The non-transitory computer-readable medium of claim 7, the method comprising contracting the query result by replacing an instance of the adapted sub-graph in the query result with the pre-specified sub-graph.

9. The non-transitory computer-readable medium of claim 1, where nodes in the stored graph represent elements of an information technology (IT) infrastructure and where edges in the graph represent relationships between the elements of the IT infrastructure.

10. A system, comprising:
a configuration management data store (CMDB) to store descriptions of components of an information technology (IT) infrastructure and to store a directed graph describing relationships between the components of the IT infrastructure;
a calculated class logic to transform an application query that complies with an application model into a graph query that complies with a graph model, where the application query is transformed as a function of calculated class data that describes a sub-graph that is to replace a portion of the application query in the graph query and how to preserve logical conditions and links associated with the portion of the application query in the graph query, where the application model is associated with an application, and where the graph model is associated with the directed graph; and a topological query logic to execute the graph query on the directed graph and to provide a result graph as a function the graph query.

11. The system of claim 10, comprising a reversal logic to transform the result graph that complies with the graph model into a result graph that complies with the application model.

12. The system of claim 11, where the reversal logic rewinds stack data generated by the calculated class logic to transform the result graph that complies with the graph model into the result graph that complies with the application model, where the stack data describes a series of transformations made by the calculated class logic.

13. A system, comprising:
   means for transforming a query from a first model associated with an application to a second model associated with a stored graph and generating a transformation history;
   means for executing the query on the stored graph to generate a query result; and
   means for transforming the query result from the second model to the first model and reading the transformation history,
   the transformation history describing a process by which the query was transformed from the first model to the second model,
   the means for transforming the query result reverses actions described in the process.

14. The system of claim 13, comprising means for receiving the query from a client and means for providing a transformed query result to the client.

15. The system of claim 13, comprising means for storing the stored graph.

* * * * *